US005355584A

United States Patent [19]

Huang

[11] Patent Number: 5,355,584

[45] Date of Patent: Oct. 18, 1994

[54] HOSE CUTTING DEVICE

[75] Inventor: Chih-Chieh Huang, Taichung Hsien, Taiwan

[73] Assignee: Taiwan Shin-Lin Company Ltd., Taichung Hsien, Taiwan

[21] Appl. No.: 138,979

[22] Filed: Oct. 21, 1993

[51] Int. Cl.5 .............................................. B23D 21/06

[52] U.S. Cl. .......................................... 30/92; 30/124; 30/331

[58] Field of Search .................. 30/92, 124, 278, 112, 30/330, 331; 83/582

[56] References Cited

U.S. PATENT DOCUMENTS 241,534 5/1881 Glazier .................................. 30/92
3,807,046 4/1974 Igyarto et al. .......................... 30/92
4,336,652 6/1982 Robertson .............................. 30/92
4,574,477 3/1986 Lemkin et al. ........................ 30/124
4,785,538 11/1988 Meyer .................................... 30/92
4,873,767 10/1989 Lok ...................................... 30/278

FOREIGN PATENT DOCUMENTS 891028 3/1962 United Kingdom ................ 30/91.2

*Primary Examiner*—Richard K. Seidel
*Assistant Examiner*—Hwei-Siu Payer

[57] ABSTRACT

A hose cutting device comprises an upper seat and a lower seat. The upper seat is provided with a cutting tool and two connection portions, each of which has a retaining slot. The lower seat is provided with a cutting tool receiver corresponding in location to the cutting tool of the upper seat, and with two connection portions, each of which has a projection dimensioned to be received and retained in the retaining slot of the upper seat at such time when the upper seat and the lower seat are caused by hand to move in opposite directions to close on a hose to be cut.

1 Claim, 4 Drawing Sheets

HOSE CUTTING DEVICE

BACKGROUND OF THE INVENTION

The present invention relates to a device for use in cutting a hose,

The conventional instruments that are commonly used in cutting a hose include a pair of scissors, a knife, etc.. Such instruments as mentioned above are not exactly the handy tools for use in cutting a flexible hose. The scissors comprise two opposing blades which are pivoted together in the middle so that they work against each other as the instrument is closed on a hose to be cut. The two opposing blades of the scissors moving in opposite directions are not situated on the same planar surface. As a result, the scissors tend to move sideways at the time when the scissors are in the process of cutting a tough article, such as a hose. Therefore, it often turns out to be a rather frustrating experience for a person who tries to cut a hose with the scissors. As compared with the scissors, the knife is not a better instrument for use in cutting a hose in view of the fact that the point of application of the knife can not be easily located, and that the hose to be cut is not well located either. Consequently, the knife and the hose slip out of place easily at the time when the cutting process is under way.

SUMMARY OF THE INVENTION

It is therefore the primary objective of the present invention to provide a hose cutting device, which is simple in construction and can be therefore assembled easily.

A further objective of the present invention is to provide a hose cutting device capable of cutting the hose with ease and precision.

In keeping with the principles of the present invention, the foregoing objectives of the present invention are accomplished by the hose cutting device, which comprises mainly an upper seat and a lower seat. The upper seat is provided at the front end thereof with a cutting tool while the lower seat is provided with a cutting tool receiver corresponding in location to the cutting tool of the upper seat. The upper and the lower seats are provided respectively with a connection portion. The connection portion of the upper seat had a retaining slot provided with two retaining portions while the connection portion of the lower seat has two projections, each of which has a slanted surface. The two projections of the connection portion of the lower seat are received in the retaining slot of the connection portion of the upper seat at the time when the upper and the lower seats are caused to move in opposite directions to close on a hose to be cut, thereby enabling the cutting device to cut the hose with precision.

The foregoing objectives, structures and features of the present invention can be more readily understood by studying the following detailed description of the present invention in conjunction with the drawings provided herewith.

DETAILED DESCRIPTION OF THE INVENTION

Figure 1:
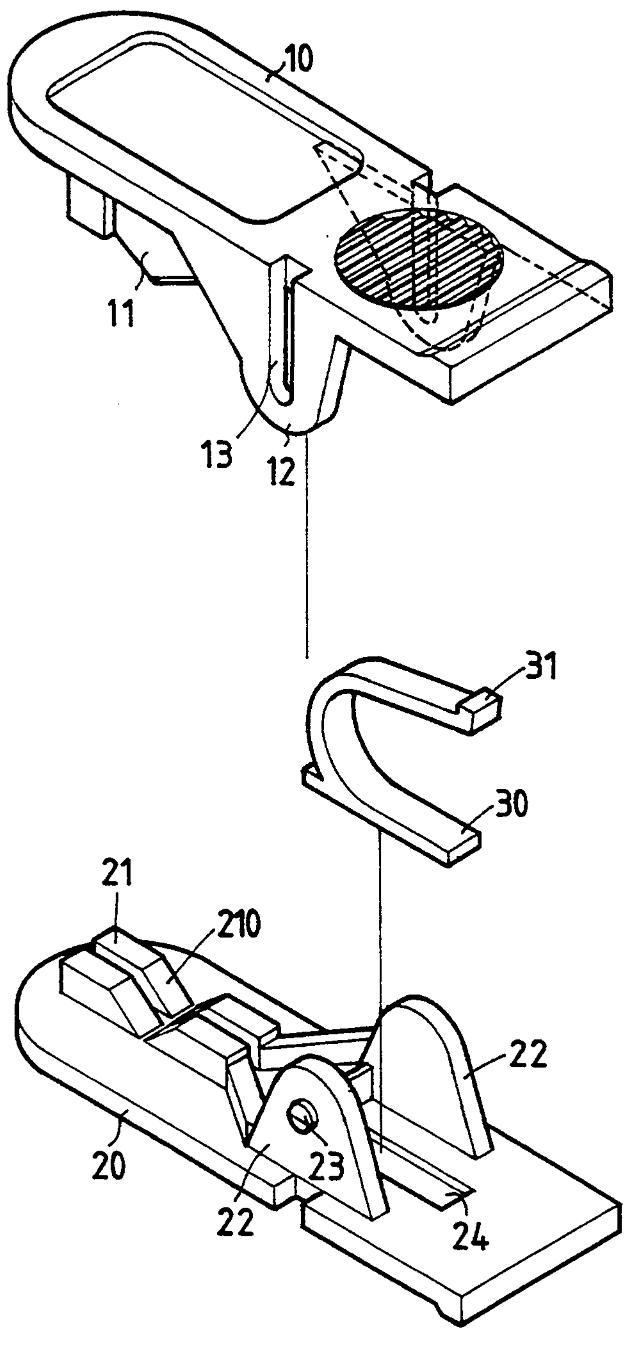
FIG. 1 shows an exploded view of the present invention.

As shown in FIG. 1, the present invention comprises an upper seat 10 and a lower seat 20. The upper seat 10 is provided in the front portion thereof with a cutting tool 11. The lower seat 20 is provided with a cutting tool receiver 21 having a notch 210 corresponding in location to the cutting tool 11. In addition, the upper and the lower seats 10 and 20 are provided respectively with connection portions 12 and 22, which are corresponding in location to each other. The connection portion 12 of the upper seat 10 has a retaining slot 13 provided respectively in two opposite sides thereof with a retaining portion 14. The connection portion 22 of the lower seat 20 has a projection 23 with a slanted surface. Located between the upper seat; 10 and the lower seat 20 is a U-shaped elastic element 30 having one end that is located in a locating slot 24 of the lower seat 20. The elastic element 30 has another end provided with a protruded portion 31 which can be located in a recess 15 of the upper seat 10.

Figure 2:
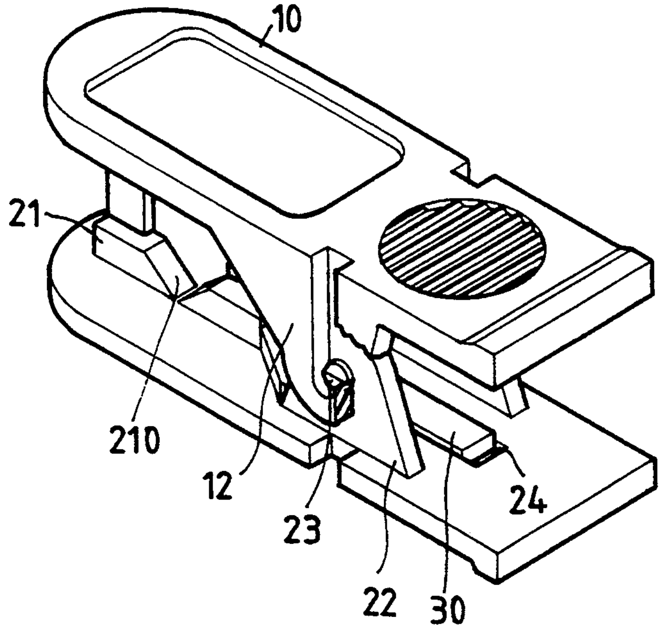
FIG. 2 shows a perspective view of the present invention in combination.
Figure 4:
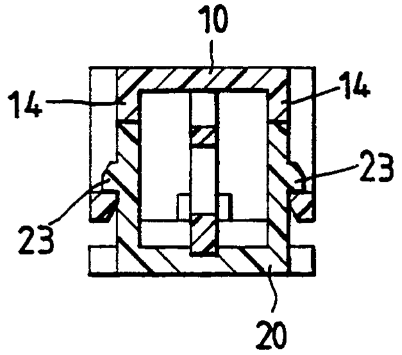
FIG. 4 shows a side sectional view of the present invention.
Figure 3:
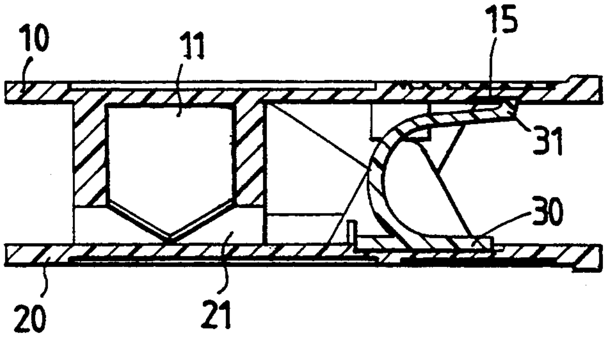
FIG. 3 shows a front sectional view of the present invention.

In operation, the upper and the lower seats 10 and 20 are caused by hand to move in opposite directions such that the projection 23 of the connection portion 22 of the lower seat 20 is received in the retaining slot 13 of the connection portion 12 of the upper seat 10, and that the top end of the connection portion 22 of the lower 20 is retained and located in the retaining portion 14 of the connect ion port ion 12 of the upper seat 10, as shown in FIGS. 2, 3 and 4. The upper and the lower seats 10 and 20 can be caused by the elastic element 30 to move away from each other to return to their original positions.

Figure 5:
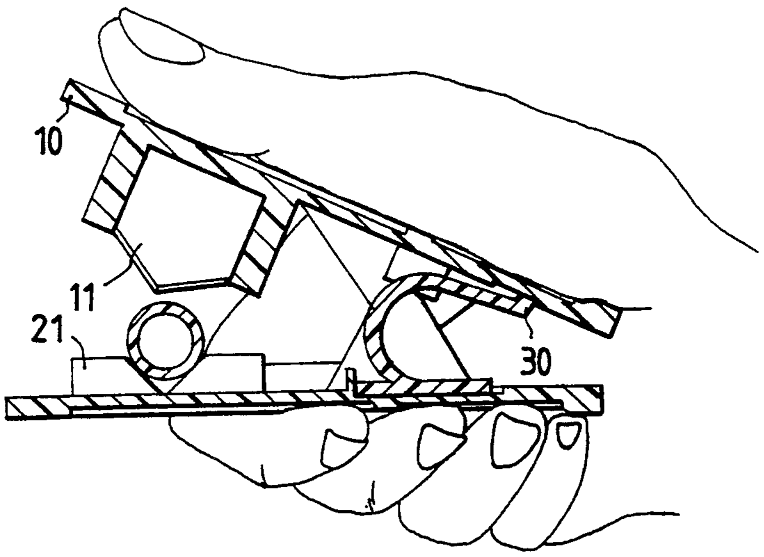
FIG. 5 shows a schematic view of the present invention in action.

Now referring to FIG. 5, a hose to be cut is shown to be disposed in the notch 210 of the cutting tool receiver 21 of the lower seat 20. The upper and the lower seats 10 and 20 are forced by hand to move in opposite directions to close on the hose held in the notch 210. As a result, the hose is cut by the cutting tool 11 of the upper seat 10 with precision and speed. In addition, the present invention is provided with a safety feature preventing an accidental bodily injury to a user of the present invention, Before the upper and the lower seats 10 and 20 are forced by hand to close on the hose held in the notch 210, the rear ends of the upper and the lower seats 10 and 20 are urged by the elastic element 30, thereby causing the front ends of the upper and the lower seats 10 and 20, where the cutting tool 11 and the cutting tool receiver 21 are located, to be closed.

The advantages inherent in the present invention are readily apparent and are further described hereinafter.

The present invention is simple in construction and can be therefore made at a low cost. The upper and the lower seats 10 and 20 are pivoted together and can be assembled easily and rapidly.

The present invention is handy and can be operated easily with one hand.

The present invention is provided with the cutting too 11, the cutting tool receiver 21, and the notch 210 in which a hose to be cut is located securely. As a result, the present invention is capable of doing an excellent job of cutting a hose.

The embodiment of the present invention described above is to be regarded in all respects as merely illustrative and not restrictive. Accordingly, the present invention may be embodied in other specific forms without deviating from the spirit threof. The present invention is therefore to be limited only by the scope of the following appended claims.

What is claimed is:

1. A hose cutting device comprising:

an upper seat provided with a cutting tool and two connection portions, each of which has a retaining slot;

a lower seat provided with a cutting tool receiver corresponding in location to said cutting tool of said upper seat, and with two connection portions, each of which has a projection dimensioned to be received and retained in said retaining slot of said upper seat; and an elastic element mounted between said upper seat and said lower seat;

wherein said two connection portions of said upper seat are provided respectively on one side thereof with a retaining portion capable of retaining a top of each of said two connection portions of said lower seat; and wherein said elastic element is of a U-shaped construction and has one end provided with a protruded portion capable of being located in a recess of said upper seat, said elastic element having another end that is located in a locating slot of said lower seat.

* * * * *